Oct. 18, 1932.   S. A. ESKILSON   1,883,655
PENDULUM CONTROLLED LENS APPARATUS
Filed March 4, 1930
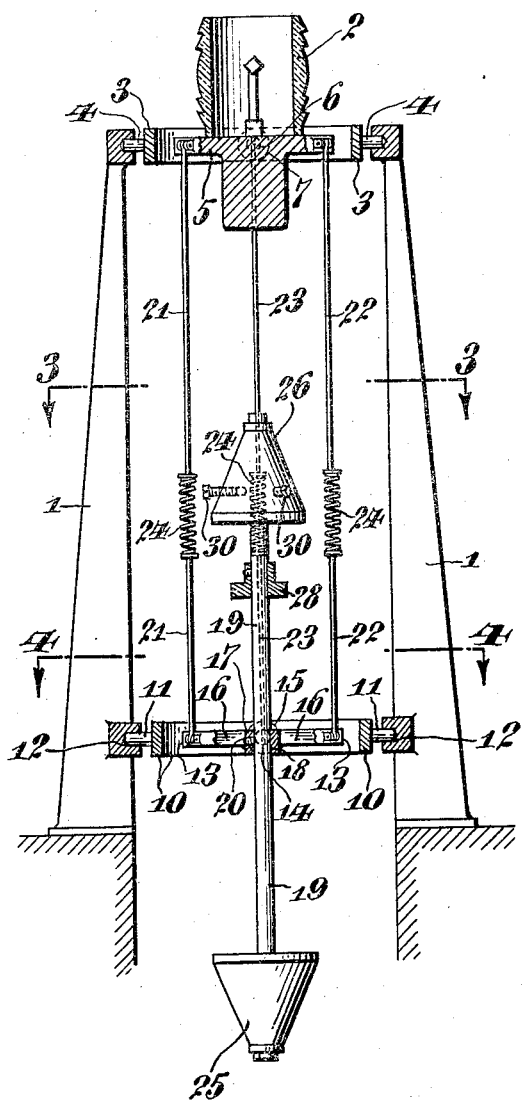
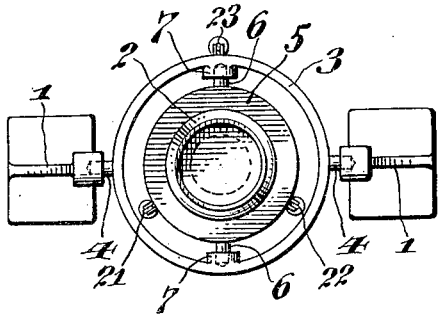
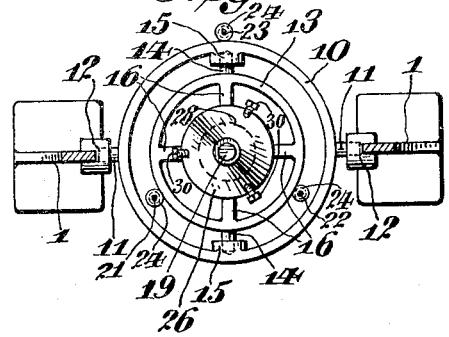
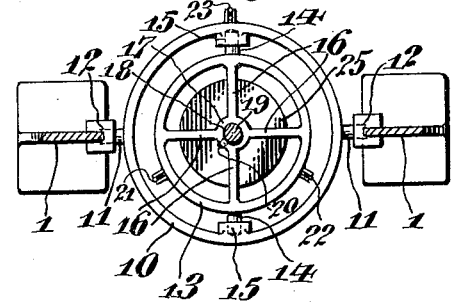
PROPRIETOR,
Sven August Eskilson
By Cyrus N. Anderson
Attorney Patented Oct. 18, 1932

1,883,655

UNITED STATES PATENT OFFICE

SVEN AUGUST ESKILSON, OF STOCKHOLM, SWEDEN, ASSIGNOR TO AMERICAN GASACCUMULATOR COMPANY, OF ELIZABETH, NEW JERSEY, A CORPORATION OF NEW JERSEY

PENDULUM CONTROLLED LENS APPARATUS

Application filed March 4, 1930, Serial No. 433,027, and in Sweden March 6, 1929.

This invention relates to means or mechanism for maintaining the lens apparatus mounted upon lightships, luminous buoys and the like, in a vertical or substantially vertical position. It relates particularly to devices including a stabilizing pendulum which is or should be suspended at or in proximity to the center of oscillation of the ship, buoy or the like. The stabilizing pendulum is connected with the lens apparatus by suitable mechanical, pneumatic or hydraulic transmission means. Such connecting means is known in the art and any suitable known means adapted for the purpose may be employed.

The general object of the invention is to provide means for preventing the lens apparatus from swinging or assuming oblique positions; that is, positions in which the longitudinal axis of the lens apparatus is angularly related to a vertical line through the said apparatus.

The object of the invention is attained by the providing of a stabilizing pendulum having a large moment of inertia as compared with the moment of inertia of the lens apparatus, and also having a small stabilizing moment. Means is provided whereby the moments may be adjusted so that the frequency of oscillation of the pendulum shall be less than that of the ship or buoy upon which the pendulum is mounted. It is desirable that the weight of the stabilizing pendulum be kept as small as is practical or possible so that the friction in the bearings by which the pendulum is supported may be small.

In order to provide a stabilizing pendulum having a large moment of inertia and a small stabilizing moment the mass of the pendulum is distributed over parts located above and below the center of suspension thereof; that is to say, the mass of the pendulum is embodied in parts located above and below its center of suspension. When a pendulum is so constructed the upper part or parts of the mass thereof partly balance the stabilizing moment of the lower parts thereof, whereas the moments of inertia of the upper and lower parts with regard to the point of suspension of the pendulum are added to one another.

The upper and lower pendulum parts should be arranged so that the center of gravity of the parts are located in a line passing through the center of suspension of the pendulum, said line being vertical when the said pendulum is in a position of equilibrium. Adjustable means is provided for locating the pendulum in a position of equilibrium with a vertical line through the center of gravity passing through the center of suspension of the pendulum.

In order that the natural period of oscillation of the stabilizing pendulum may be adjusted to suit various conditions means is provided whereby the center of gravity of the mass of the pendulum on one side or the other of the center of suspension is movable along a line which when the pendulum is in equilibrium extends in a vertical direction. Such adjustment of the center of gravity may be effected either by means of separate weights provided especially for that purpose or by an adjustment of the masses mounted at the opposite ends of the pendulum which constitute essential parts of the pendulum structure.

Without further amplification of the objects of the invention I shall now proceed with a detailed description thereof wherein other objects will be mentioned specifically or else will be apparent.

In order that the invention may be readily understood and its practical advantages fully appreciated reference should be had to the accompanying drawing wherein I have illustrated a structure constituting a preferred embodiment of the invention. However, it will be understood that the invention is susceptible of embodiment in other forms of construction than that shown and that changes in the details of construction may be made within the scope of the claims without departing from the invention or the principle thereof.

In the drawing:

Fig. 1 is a view in longitudinal sectional elevation of a structure embodying the invention;

Fig. 2 is a top plan view thereof;

Fig. 3 is a transverse sectional view taken on the line 3—3 of Fig. 1; and

Fig. 4 is a similar view taken on the line 4—4 of Fig. 1.

In the drawing I have shown posts or standards 1 by means of which the lens apparatus and the pendulum apparatus embodying the invention may be supported. These posts or standards are so positioned that when the controlling pendulum is mounted thereon it is located at or near the center of oscillation of the floating ship, buoy or the like upon which the apparatus is mounted.

The lens apparatus indicated at 2 is mounted upon a gimbal device of known construction comprising an outer ring 3 journaled by means of journals 4 in bearings provided upon the upper ends of the posts or standards 1 and an inner disc 5 (which also may be in ring form) provided with journals 6 mounted in bearings 7 provided upon the ring 3. For supporting the pendulum I have provided a like gimbal device comprising an outer ring 10, having journals 11 which are journaled in bearings 12 located near the lower ends of the posts or standards 1, and an inner ring 13 provided with journals 14 mounted in bearings 15 provided upon the outer ring 10. The ring 13 is provided with cross bars 16 the middle portions of which unite in a hub 17 having a central vertical opening 18 therethrough which constitutes a supporting bearing within which the pendulum bar 19 may be secured by means of a fastening clamping screw 20. By loosening the screw 20 the bar 19 may be adjusted lengthwise within the opening 18. The gimbal devices at the top and bottom of the structure are connected by rods or bars 21, 22 and 23. Each of these bars is provided intermediate its ends with yielding means consisting of coiled springs 24 in the construction as illustrated. Yielding means of any other suitable construction may be employed. The bars 21 and 22 are connected at their upper ends to the disc or ring 5 and at their lower ends to the ring 13, while the bar 23 is connected at its upper end to the ring 3 and at its lower end to the ring 10. The employment of these bars and the connection thereof at their opposite ends to their respective gimbal devices are known constructions, and further description thereof or of their operation and purpose is deemed unnecessary.

The pendulum bar 19 is provided with weights 25 and 26 which preferably are secured adjustably to the portions thereof upon opposite sides of its point of connection to the hub 17 of the ring 13. In the construction as illustrated the weights 25 and 26 are located in adjoining relation to the lower and upper ends respectively of the bar 19. Any suitable means may be employed for permitting or enabling adjustment of the said weights upon the said bar either toward or from the middle portion thereof.

The moment of the weight 26 preferably should be less than the moment of the weight 25 and in order that the moment of the portion of the pendulum structure above the point of connection of the bar 19 to the ring 13 may be adjusted so as to obtain such relation to the portion of the pendulum below such connection as may be necessary to obtain the operation of the pendulum desired, a weight 28 may be adjustably mounted upon the upper portion of the bar 19 between the weight 26 and the hub 17 of the ring 13. If means be provided for adjusting the weight 26 the weight 28 may be omitted.

When the pendulum is in a position of equilibrium the center of gravity of the portion of the pendulum structure above its point of connection to the ring 13 should be located in a vertical line directly above the center of gravity of the lower part of the pendulum structure; that is, the center of gravity of the weight 25. Such a line will pass through the center of suspension of the pendulum, that is, through the point about which the pendulum oscillates.

In order to adjust the position of the center of gravity of the upper part of the pendulum structure to locate the same in a position directly above the center of gravity of the weight 25 when the pendulum is in a state of equilibrium, I have provided adjustable weights 30.

Although I have provided three weights arranged in 120° relation to each other as shown in Fig. 3 it is to be understood that a single adjustable weight may be employed for that purpose. Similar weights also may be provided upon the lower weight 25. It will be understood that these adjustable weights 30 may be provided upon one or the other or both of the weights 25 and 26 or they may be provided upon the pendulum bar 19.

By adjusting the parts making up the mass of the portion of the pendulum above its point of suspension the center of gravity is adjusted or moved along a line which is vertical when the pendulum is in a position of equilibrium. The same thing is true with respect to the mass of the pendulum located below the center of suspension of the pendulum.

It will be understood that the pendulum weights 25 and 26 at the oposite ends of the bar 19 may be of any suitable desired form and shape.

It will be seen that by my invention I have provided a pendulum controlled device embodying means whereby the period of oscillation may be controlled, the said pendulum structure including means whereby by the adjusting thereof the said pendulum may be placed or established in a position of equilibrium.

It also will be seen that by the location of portions of the pendulum structure upon opposite sides of its center of suspension the moments of the force of gravity acting upon the said portions tend to balance each other. By proper adjustment of the parts of the pendulum upon opposite sides of its center of suspension the relation of these oppositely acting portions may be varied to thereby control in a practical way the operation of the pendulum structure to maintain the lens apparatus in vertical position. It will be understood that although the lens apparatus or other structure, as the case may be, will be maintained in a substantially vertical position as above described yet it will assume or occupy positions in oblique relation to the ship, buoy or other floating support.

Having thus described my invention, what I claim and desire to secure by Letters Patent is:

1. Pendulum controlled lens apparatus for lightships, luminous buoys and the like, and in which a stabilizing pendulum is suspended at or in proximity to the center of oscillation of the ship or the like, transmission means connecting said pendulum to said lens apparatus, said pendulum having a large moment of inertia as compared with the moment of inertia of the lens apparatus, and means having connection with the pendulum bar to render the moment of stabilization of said pendulum small so that the frequency of oscillation of the pendulum lens apparatus will be less than that of the ship, buoy or the like.

2. Means for maintaining in a substantially vertical position a lens apparatus or other structure which is pivotally supported upon a floating ship, buoy or the like consisting of a pendulum the mass of which comprises parts located respectively above and below its center of suspension, means for effecting relative adjustments of parts of said mass, and transmission means between said pendulum and said lens apparatus or other structure.

3. Means for maintaining in a substantially vertical position a lens apparatus or other structure which is pivotally supported upon a floating ship, buoy or the like consisting of a pendulum the mass of which is divided into parts one of which is located above and the other below the center of suspension of the said pendulum, the centers of gravity of said parts being located on a line which is vertical when the pendulum is in a position of equilibrium, which line passes through the center of suspension of the said pendulum, means for varying the moment of stability of said pendulum, and transmission means between said pendulum and said lens apparatus or other structure.

4. Means for maintaining in a substantially vertical position a lens apparatus or other structure which is pivotally supported upon a floating ship, buoy or the like consisting of a pendulum having main mass parts located respectively above and below the center of suspension of the said pendulum, the centers of gravity of which are adjustable along the line which occupies a vertical position when the said pendulum is in a state of equilibrium.

5. Means for maintaining in a substantially vertical position a lens apparatus or other structure which is pivotally supported upon a floating ship, buoy or the like consisting of a pendulum comprising a bar connected at a point intermediate its ends to a pivotal support, the said bar having mass parts secured thereto above and below the center of suspension of the said pendulum, and means for adjusting one of said mass parts, in directions transversely of the length of the said pendulum.

6. Means for maintaining in a substantially vertical position a lens apparatus or other structure which is pivotally supported upon a floating ship, buoy or the like comprising a pendulum consisting of a bar suspended from a point intermediate its ends, said bar having weights secured thereto above and below its point of suspension, means for adjusting the position of the center of gravity of a weight, and means for operatively connecting the said pendulum with the said lens apparatus or other structure.

7. Means for maintaining in a substantially vertical position a lens apparatus or other structure which is pivotally supported upon a floating ship, buoy or the like consisting of a pendulum comprising a bar suspended from a point intermediate its ends, a weight connected to the said bar below its point of suspension, and a weight connected to the said bar above its point of suspension, the moment of the weight connected to the said bar below its point of suspension being greater than that of the weight connected to the said bar above its point of suspension.

8. Means for maintaining in a substantially vertical position a lens apparatus or other structure which is pivotally supported upon a floating ship, buoy or the like consisting of a pendulum comprising a bar suspended at a point intermediate its ends, a weight mounted upon said bar below its point of suspension, and a plurality of weights mounted upon said bar above its point of suspension, some of the said weights being relatively adjustable.

9. Means for maintaining in a substantially vertical position a lens apparatus or other structure which is pivotally supported upon a floating ship, buoy or the like comprising a pendulum consisting of a bar suspended at a point intermediate its ends, a weight mounted upon the portion of said bar below its point of suspension, a plurality of weights mounted upon said bar above its point of suspension, one at least of said weights being adjustable lengthwise of the said bar, and means adjustable transversely of the said bar for changing the location of the center of gravity of the mass of the pendulum above its point of suspension.

10. Pendulum controlled lens apparatus for lightships, luminous buoys and the like comprising a pendulum suspended at or adjacent the center of oscillation of the ship, or the like, whose moment of inertia is large relative to the moment of inertia of the lens apparatus and the moment of whose mass above the axis of oscillation of the pendulum is suitably less than the moment of the mass below said axis to effect a frequency of oscillation of the pendulum less than the frequency of oscillation of the ship, buoy or the like.

11. Apparatus for maintaining an oscillatably mounted object in a desired position with respect to the vertical comprising a pendulum structure having a portion of its mass above the center of suspension and another portion below the center of suspension, the moment of the latter portion being substantially greater than the moment of the former portion, and motion transmission means connecting the pendulum to the object.

In testimony that I claim the foregoing as my invention, I have hereunto signed my name this 17th day of February, A. D., 1930.

SVEN AUGUST ESKILSON.